Figure 1:
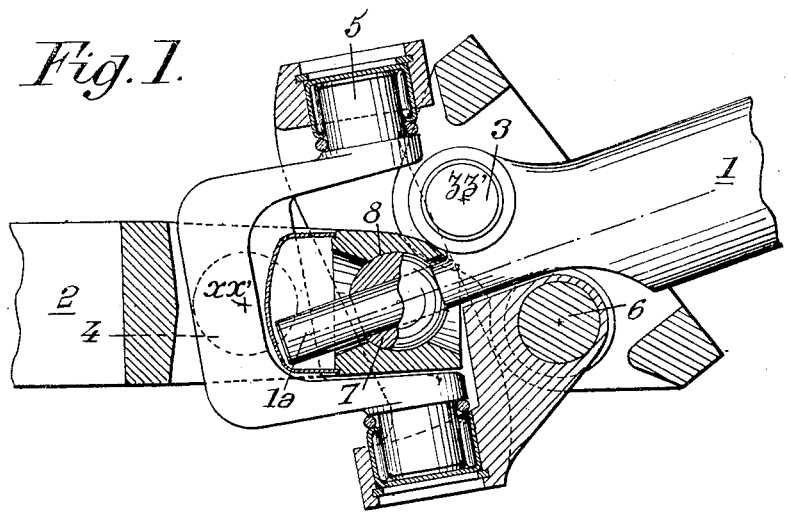

Jan. 26, 1965  G. R. BOUCHARD  3,166,918
UNIVERSAL JOINTS, ESPECIALLY FOR AUTOMOBILE VEHICLES
Filed April 4, 1963  2 Sheets-Sheet 1

INVENTOR
GASTON Robert Bouchard
BY Bailey, Stephens & Huettig
ATTORNEYS

Jan. 26, 1965  G. R. BOUCHARD  3,166,918
UNIVERSAL JOINTS, ESPECIALLY FOR AUTOMOBILE VEHICLES
Filed April 4, 1963  2 Sheets-Sheet 2

INVENTOR
Gaston Robert Bouchard
BY Bailey, Stephens
& Huettig
ATTORNEYS.

United States Patent Office 3,166,918
Patented Jan. 26, 1965

3,166,918
UNIVERSAL JOINTS, ESPECIALLY FOR
AUTOMOBILE VEHICLES
Gaston Robert Bouchard, 3 Rue Henri Barbusse,
Bougival, France
Filed Apr. 4, 1963, Ser. No. 270,713
Claims priority, application France, Apr. 13, 1962,
894,474
6 Claims. (Cl. 64—17)

The present invention relates to universal joints in particular of the expansible type, this term designating in the present case devices for connecting together a driving shaft and a driven shaft, the respective axes of which substantially meet each other, said devices consisting of elements arranged and assembled together in such manner as to permit some respective variations of the relative directions (and in the case of expansible shafts of the relative axial positions) of said shafts. The invention is more especially concerned with universal joints for automobile vehicle transmissions.

The object of the present invention is to provide a device of the above mentioned kind which is better adapted to meet the requirements of practice than those used for the same purpose up to the present time.

The invention relates to universal joint devices for coupling two shafts together, comprising two pivot members carried by said respective shafts, practically without axial play about respective axes at right angles to said shafts, one of said axes, called first pivot axis, intersecting the axis of the shaft by which it is carried, whereas the other of said pivot axis, which is called the second pivot axis, is preferably offset on one side of the other shaft, by which it is carried, intermediate connecting means between said shafts comprising at least two parts pivoted to each other, practically without axial play, about a third pivot axis, said parts being pivotally connected with said pivot members, respectively, about said two first mentioned pivot axes, said third pivot axis being orthogonal to said two first mentioned pivot axes, and connecting means between said shafts comprising on the one hand a male element at least a portion of the external surface of which has an axis of revolution, said male element being carried by one of said shafts and disposed so that said axis of revolution intersects the axis of the last mentioned shaft at right angles thereto, and on the other hand a female element carried by the other of said shafts and arranged to have its inner wall constantly in contact, along at least one line, with the external surface of revolution of said male element.

According to the present invention such a joint is characterized in that, on the one hand, said male and female elements are movable with respect to each other with a supplementary degree of freedom in a general direction parallel to one of the two first mentioned pivot axes and on the other hand said male element is slidable with respect to one of said shafts in a direction parallel to the axis thereof.

Preferred embodiments of the invention will be hereinafter described with reference to the appended drawings, given merely by way of example, and in which.

Figure 2:
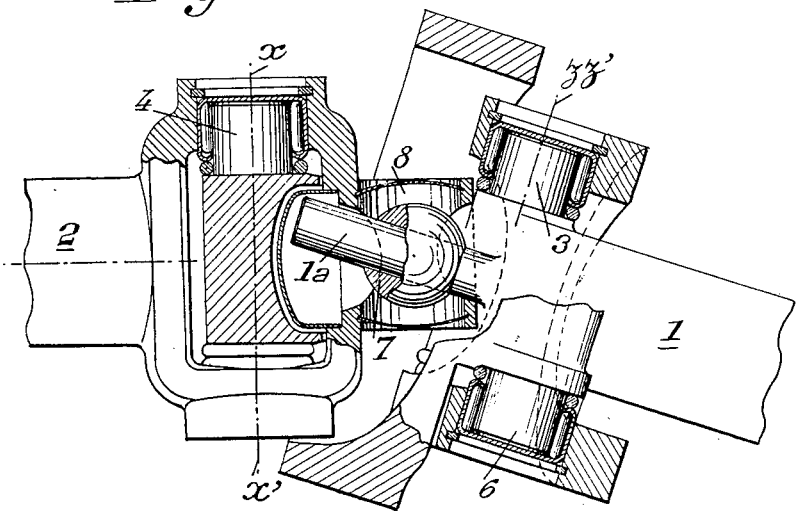
Figure 3:
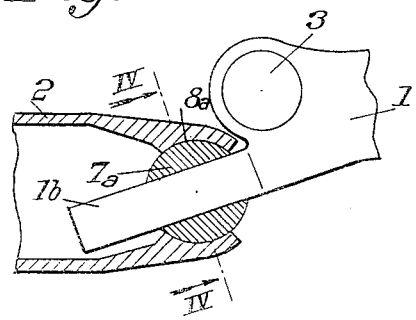
Figure 4:
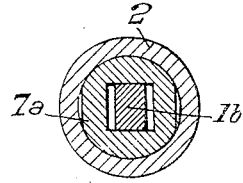
Figure 5:
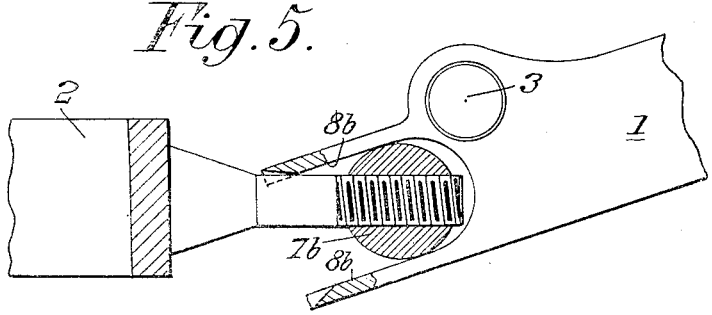
Figure 6:
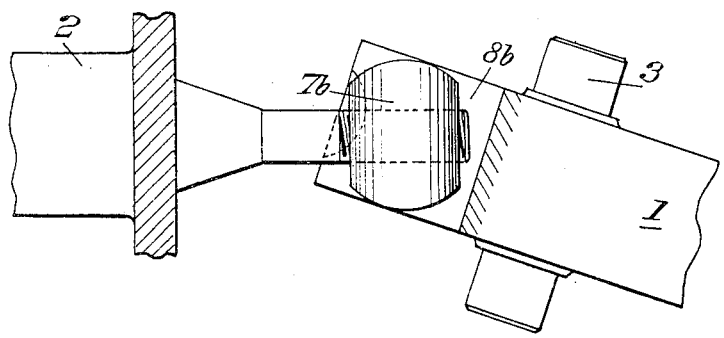

FIGS. 1 and 2 are sectional views, in two planes perpendicular to each other, of a universal joint made according to a first embodiment of the invention; the two shafts connected through these joints occupying in FIGS. 1 and 2 different relative angular positions;

FIGS. 3 and 4 diagrammatically show, respectively, in longitudinal section and in cross section on the line IV—IV of FIG. 3, another embodiment of a joint according to the present invention;

FIGS. 5 and 6 are diagrammatical views, analogous to FIGS. 1 and 2, of a third embodiment of a universal joint according to the invention.

The universal joint illustrated by the drawings is intended to connect together a driving shaft 1 and a driven shaft 2 leading to a vehicle wheel to be driven and preferably free to move axially in both directions within given limits. In this case the driving shaft 1 is axially fixed in both directions.

In the following description, it should be understood that the word "pivot" is taken in its widest meaning, applying both to the case where a fixed bearing cooperates with a rotating shaft element and to that where a fixed shaft element serves to support a rotating bearing.

Such a device comprises, in a known fashion and as illustrated by the drawings and in particular by FIGS. 1 and 2 the following elements:

(1) Two pivot pins 3 and 4 respectively carried, without any substantial axial play, by the driving shaft 1 and the driven shaft 2, respectively, one of these end pivot pins, for instance 4 carried by shaft 2, being perpendicular to said shaft (which means that the axis $xx'$ of pivot 4 intersects the axis of driven shaft 2, substantially at right angles thereto) whereas the other end pivot pin, to wit pivot pin 3, is orthogonal, that is to say at right angles but laterally offset, with respect to the shaft 1 that carries it, which means that the axis $zz'$ of pivot pin 3 does not intersect the axis of driving shaft 1;

(2) Connecting means between joints 1 and 2 comprising two elements 11 and 12 pivotally connected to each other with respect to an intermediate pivot pin 5, mounted without any substantial axial play, said pin 5 being mounted between pivot pins 3 and 4 and being substantially at right angles thereto so as to couple shafts 1 and 2 together in rotation.

Elements 11 and 12, mounted on either side of intermediate pivot pin 5, might be directly connected to shafts 1 and 2 through the end pivot pins 3 and 4, respectively. But, in order to obtain an expansible joint, element 12 is directly connected to shaft 2 through pivot pin 4 whereas element 11 is indirectly connected to shaft 1 through an element 16 pivotally mounted between shaft 1 and said element 11 about pivot pin 3 and a supplementary pivot 6, parallel to 3, respectively, said pivot pin 6 being carried by element 16 without any substantial axial play: Preferably, as shown, supplementary pivot pin 6 is offset with respect to the axis of driving shaft 1 on the side thereof opposed to that where end pivot 3 is itself offset.

I provide between the adjacent ends of shafts 1 and 2, that is to say in the central region of the joint, connecting means which include the following elements:

On the one hand, a male element at least a portion of the external surface of which has at least one axis of revolution, this male element being carried by one of the shafts and arranged so that said axis of revolution is perpendicular to, and intersects, the axis of the shaft in question, and On the other hand, a female element carried by the other shaft and adapted to have its inner wall constantly in contact along at least one line with the external surface of revolution of said male element.

Now according to the main feature of the invention, the joint is arranged in such manner that:

On the one hand, the male element and the female element of the connecting means have, with respect to each other, a supplementary degree of freedom in a general direction parallel to one of the end pivot pins (that is to say parallel to $xx'$ or $zz'$), and On the other hand, the male element has, with respect to one of the two shafts, a supplementary degree of freedom in a direction parallel to said last mentioned shaft.

For this purpose, in the embodiment illustrated by FIGS. 1 and 2, the male element of said connecting means consists of a cylindrical member 7 carried by the driving shaft 1 and fitting rotatably in a cylinder 8 carried by the driven shaft 2 and which constitutes the female element of said connecting means, said cylinder 8 having its axis parallel to that of end pivot pin 4.

On the other hand, the supplementary degree of freedom of male element 7 with respect to shaft 1 in the direction parallel to said shaft is obtained by mounting said member 7 slidable on an axial cylindrical extension $1_a$ of shaft 1.

According to the construction of FIGS. 3 and 4, the male element $7_a$ is a socket joint member, the female element $8_a$ consisting of a spherical ball $8_a$ fitting in said socket.

In this embodiment, the supplementary degree of freedom of socket $7_a$ is obtained by making an extension $1_b$ of shaft 1 of rectangular cross section and giving the housing provided in said member $7_a$ for the passage of extension $1_b$ a square cross section the side of which is substantially equal to the large side of the rectangular cross section of extension $1_b$, so that the latter can move transversely.

Finally, FIGS. 5 and 6 show a third embodiment of the invention, according to which the male element consists of a cylinder $7_b$ preferably capable of undergoing slight variations of direction, so as to take into account the constructional tolerances (for instance owing to its being mounted on a threaded rod), the female element intended to cooperate with said cylinder consisting of a kind of fork carried by the driving shaft 1 and comprising two parallel planes $8_b$ tangent to said cylinder $7_b$ and parallel to the end pivot pin 3 carried by said driving shaft.

In a general manner, while I have, in the above description, disclosed what I deem to be practical and efficient embodiments of the invention, it should be well understood that I do not wish to be limited thereto as there might be changes made in the arrangement, disposition and form of the parts without departing from the principle of the present invention, as comprehended within the scope of the appended claims.

What I claim is:

1. For use in a system including two shafts, a first one and a second one, a universal joint device for coupling said shafts together which comprises, in combination, two pivot members carried by said respective shafts, practically without axial play, about respective pivot axes at right angles to said shafts, one of said axes, called first pivot axis, intersecting the axis of the first shaft, by which it is carried, the other of said pivot axes being called the second pivot axis, and intermediate connecting means between said shafts, said connecting means comprising two parts pivoted to each other, practically without axial play, about a third pivot axis, said parts being pivotally connected with said shafts, respectively, about said two first mentioned pivot axes, said third pivot axis being orthogonal to said two first mentioned pivot axes, said connecting means further comprising on the one hand a male element at least a portion of the external surface of which is of revolution about an axis, said male element being carried by one of said shafts and so disposed that said last mentioned axis of revolution intersects the axis of the last mentioned shaft at right angles thereto, and on the other hand a female element carried by the other of said shafts and arranged to have its inner wall constantly in contact, along at least one line, with the external surface of revolution of said male element, said male and female elements being movable with respect to each other in a direction parallel to one of the two first mentioned pivot axes, and said male element being slidable with respect to one of said shafts parallelly to the axis thereof.

2. For use in a system including two shafts, a first one and a second one, a universal joint device for coupling said shafts together which comprises, in combination, two pivot members carried by said respective shafts, practically without axial play, about respective pivot axes at right angles to said shafts, one of said axes, called first pivot axis, intersecting the axis of the first shaft, by which it is carried, the other of said pivot axes being called the second pivot axis, being offset with respect to the axis of said second shaft, by which it is carried, on one side thereof, and intermediate connecting means between said shafts, said connecting means comprising three parts pivoted to one another practically without axial play, the first of said parts being pivotally connected with said first shaft about said first mentioned pivot axis, the first and second of said three parts being pivoted to each other about a third pivot axis orthogonal to said two first mentioned pivot axes, the third of said three parts being pivotally connected on the one hand with said second shaft about said second pivot axis and on the other hand with said second part about a pivot axis parallel to said second mentioned pivot axis and offset with respect to the axis of said second shaft on the other side thereof, said connecting means further comprising on the one hand a male element at least a portion of the external surface of which is of revolution about an axis, said male element being carried by one of said shafts and so disposed that said last mentioned axis of revolution intersects the axis of the last mentioned shaft at right angles thereto, and on the other hand a female element carried by the other of said shafts and arranged to have its inner wall constantly in contact, along at least one line, with the external surface of revolution of said male element, said male and female elements being movable with respect to each other in a direction parallel to one of the two first mentioned pivot axes, and said male element being slidable with respect to one of said shafts parallelly to the axis thereof.

3. For use in a system including two shafts, a first one and a second one, a universal joint device for coupling said shafts together which comprises, in combination, two pivot members carried by said respective shafts, practically without axial play, about respective pivot axes at right angles to said shafts, one of said axes, called first pivot axis, intersecting the axis of the first shaft, by which it is carried, the other of said pivot axes, called the second pivot axis, and intermediate connecting means between said shafts, said connecting means comprising three parts pivoted to one another practically without axial play, the first of said parts being pivotally connected with said first shaft about said first mentioned pivot axis, the first and second of said three parts being pivoted to each other about a third pivot axis orthogonal to said two first mentioned pivot axes, the third of said three parts being pivotally connected on the one hand with said second shaft about said second pivot axis and on the other hand with said second part about a pivot axis parallel to said second mentioned pivot axis, said connecting means further comprising on the one hand a male element at least a portion of the external surface of which is of revolution about an axis, said male element being carried by one of said shafts and so disposed that said last mentioned axis of revolution intersects the axis of the last mentioned shaft at right angles thereto, and on the other hand a female element carried by the other of said shafts and arranged to have its inner wall constantly in contact, along at least one line, with the external surface of revolution of said male element, said male and female elements being movable with respect to each other in a direction parallel to one of the two first mentioned pivot axes, and said male element being slidable with respect to one of said shafts parallelly to the axis thereof.

4. For use in a system including two shafts, a first one and a second one, a universal joint device for coupling said shafts together which comprises, in combination, two pivot members carried by said respective shafts, practically without axial play, about respective pivot axes at right angles to said shafts, one of said axes, called first pivot axis, intersecting the axis of the first shaft, by which it is carried, the other of said pivot axes, called the second pivot axis, being offset with respect to the axis of said second shaft, by which it is carried, on one side thereof, and intermediate connecting means between said shafts, said connecting means comprising three parts pivoted to one another practically without axial play, the first of said parts being pivotally connected with said first shaft about said first mentioned pivot axis, the first and second of said three parts being pivoted to each other about a third pivot axis orthogonal to said two first mentioned pivot axes, the third of said three parts being pivotally connected on the one hand with said second shaft about said second pivot axis and on the other hand with said second part about a pivot axis parallel to said second mentioned pivot axis and offset with respect to the axis of said second shaft on the other side thereof, said connecting means further comprising on the one hand a spherical male element slidably carried by said second shaft so that its center is constantly located on the axis of said second shaft and on the other hand a female element carried by said first shaft and having its inner wall in the form of a cylinder slidably accommodating said spherical male element and the axis of which is parallel to said first pivot axis.

5. For use in a system including two shafts, a first one and a second one, a universal joint device for coupling said shafts together which comprises, in combination, two pivot members carried by said respective shafts, practically without axial play, about respective pivot axes at right angles to said shaft, one of said axes, called first pivot axis, intersecting the axis of the first shaft, by which it is carried, the other of said pivot axes, called the second pivot axis, being offset with respect to the axis of said second shaft, by which it is carried, on one side thereof, and intermediate connecting means between said shafts, said connecting means comprising three parts pivoted to one another practically without axial play, the first of said parts being pivotally connected with said first shaft about said first mentioned pivot axis, the first and second of said three parts being pivoted to each other about a third pivot axis orthogonal to said two first mentioned pivot axes, the third of said three parts being pivotally connected on the one hand with said second shaft about said second pivot axis and on the other hand with said second part about a pivot axis parallel to said second mentioned pivot axis and offset with respect to the axis of said second shaft on the other side thereof, said connecting means further comprising a ball and socket joint the socket element of which is carried by said first shaft so as to have its center on the axis of said first shaft, and a projection of said second shaft extending along the axis thereof, said projection being of rectangular cross section and having two faces parallel to said second pivot axis at a given distance from each other and two faces perpendicular thereto and at a smaller distance from each other, the ball element of said ball and socket joint being provided with an axial hole of square cross section, the distance between the parallel faces of said hole being substantially equal to said first mentioned distance so that said extension of the second shaft fits between the two last mentioned faces of said hole.

6. For use in a system including two shafts, a first one and a second one, a universal joint device for coupling said shafts together which comprises, in combination, two pivot members carried by said respective shafts, practically without axial play, about respective pivot axes at right angles to said shafts, one of said axes, called first pivot axis, intersecting the axis of the first shaft, by which it is carried, the other of said pivot axes, called the second pivot axis, being offset with respect to the axis of said second shaft, by which it is carried, on one side thereof, and intermediate connecting means between said shafts, said connecting means comprising three parts pivoted to one another practically without axial play, the first of said parts being pivotally connected with said first shaft about said first mentioned pivot axis, the first and second of said three parts being pivoted to each other about a third pivot axis orthogonal to said two first mentioned pivot axes, the third of said three parts being pivotally connected on the one hand with said second shaft about said second pivot axis and on the other hand with said second part about a pivot axis parallel to said second mentioned pivot axis and offset with respect to the axis of said second shaft on the other side thereof, said connecting means further comprising on the one hand a female element consisting of a forked extension of said second shaft, the two respective branches of said forked extension having inner faces turned toward each other and located in planes parallel to each other and to said second pivot axis, and on the other hand a male element consisting of a cylindrical piece adapted to fit slidably between said faces, said cylindrical piece being threaded on said first shaft so that its axis intersects the axis of said first shaft at right angles thereto.

References Cited by the Examiner
UNITED STATES PATENTS 2,067,286  1/37  Pearce _____ 64—17
2,255,762  9/41  Dodge _____ 64—21

FOREIGN PATENTS 151,206  10/37  Austria.
1,156,248  12/57  France.

ROBERT C. RIORDON, *Primary Examiner.*